US012688717B2

(12) United States Patent

Huang

(10) Patent No.: US 12,688,717 B2

(45) Date of Patent: Jul. 21, 2026

(54) DRIVE RECORDER WITH LICENSE PLATE RECOGNITION FUNCTION AND METHOD FOR LICENSE PLATE RECOGNITION

(71) Applicant: Getac Technology Corporation, New Taipei City (TW)

(72) Inventor: Cheng-Liang Huang, Taipei City (TW)

(73) Assignee: Getac Technology Corporation, New Taipei City (TW)

( * ) Notice: Subject to any disclaimer, the term of this patent is extended or adjusted under 35 U.S.C. 154(b) by 266 days.

(21) Appl. No.: 18/422,059

(22) Filed: Jan. 25, 2024

(65) Prior Publication Data

US 2025/0005941 A1 Jan. 2, 2025

Related U.S. Application Data

(60) Provisional application No. 63/523,864, filed on Jun. 28, 2023.

(30) Foreign Application Priority Data

Sep. 27, 2023 (CN) .......................... 202311264644.7

(51) Int. Cl.
*G06V 20/60* (2022.01)
*G06T 7/11* (2017.01)
*G06V 20/62* (2022.01)

(52) U.S. Cl.
CPC .............. *G06V 20/625* (2022.01); *G06T 7/11* (2017.01)

(58) Field of Classification Search
CPC ......... G06V 20/625; G06V 20/56; G06T 7/11
See application file for complete search history.

(56) References Cited

U.S. PATENT DOCUMENTS 9,019,379 B2 4/2015 Wen-Yan et al.
10,719,743 B2 7/2020 Lei et al.
(Continued)

FOREIGN PATENT DOCUMENTS

CN 107343154 A 11/2017
CN 110620881 A 12/2019
(Continued)

OTHER PUBLICATIONS

Guo-Shiang Lin, Xian-Wei Ji, "Video quality enhancement based on visual attention model and multi-level exposure correction", Multimedia Tools and Applications, Kluwer Academic Publishers, Boston, US, vol. 75, No. 16, Aug. 8, 2015 (Aug. 8, 2015), pp. 9903-9925.
(Continued)

*Primary Examiner* — Ming Y Hon
(74) *Attorney, Agent, or Firm* — COOPER LEGAL GROUP LLC

(57) ABSTRACT

A drive recorder with a license plate recognition function and a method for license plate recognition are provided. The drive recorder includes a multi-lens camera module configured to capture motion images covering multiple viewpoints. One or more positions of license plates can be obtained according to features of the license plate, so that one or more regions of interest of the license plates in each of frames of the motion images can be determined. Different exposure compensation weights are designated to multiple zones based on a size and the position of each of the license plates. Each of the frames of the motion images can then be processed by different levels of exposure compensation according to the exposure compensation weights designated to the multiple zones. Afterwards, license plate recognition is performed on exposure-compensated images of the license plates.

20 Claims, 12 Drawing Sheets

(56) References Cited

U.S. PATENT DOCUMENTS

| | | | | |
|---|---|---|---|---|
| 11,854,277 | B1 * | 12/2023 | Xu | G06T 7/174 |
| 2002/0180759 | A1 * | 12/2002 | Park | H04N 9/8227 |
| | | | | 348/E7.086 |
| 2012/0293660 | A1 * | 11/2012 | Murakami | G06V 20/586 |
| | | | | 348/148 |
| 2013/0250106 | A1 * | 9/2013 | Chang | G06V 20/63 |
| | | | | 348/148 |
| 2014/0177925 | A1 * | 6/2014 | Wu | G06V 30/413 |
| | | | | 382/105 |
| 2017/0094136 | A1 * | 3/2017 | Middleton | G02B 7/14 |
| 2019/0132559 | A1 * | 5/2019 | Numata | H04N 23/60 |
| 2019/0251369 | A1 * | 8/2019 | Popov | G06V 20/54 |
| 2020/0118257 | A1 * | 4/2020 | Zeng | G06T 5/92 |
| 2020/0396356 | A1 * | 12/2020 | Hua | H04N 23/84 |
| 2021/0103735 | A1 * | 4/2021 | Das | G08G 1/0133 |
| 2022/0101037 | A1 * | 3/2022 | Chua | G06F 18/2415 |
| 2022/0194291 | A1 * | 6/2022 | Orihara | G08G 1/16 |
| 2023/0360409 | A1 * | 11/2023 | Yang | G06V 30/10 |
| 2023/0394850 | A1 * | 12/2023 | Gupta | G06V 10/774 |
| 2025/0005941 | A1 * | 1/2025 | Huang | G06T 7/11 |

FOREIGN PATENT DOCUMENTS

| | | |
|---|---|---|
| CN | 111491103 B | 10/2021 |
| CN | 114882486 A | 8/2022 |
| CN | 115171086 A | 10/2022 |
| TW | M348034 U | 1/2009 |
| TW | 201339994 A | 10/2013 |
| TW | I493478 B | 7/2015 |

OTHER PUBLICATIONS

Priyanka Prabhakar, P. Anupama, "A Novel Design for Vehicle License Plate Detection and Recognition", Second International Conference on Current Trends in Engineering and Technology, ICCTET 2014, IEEE, Jul. 8, 2014 (Jul. 8, 2014), pp. 7-12.

Search Report issued on Jun. 25, 2024 for EP application No. 24154636.5, 9 pages.

* cited by examiner

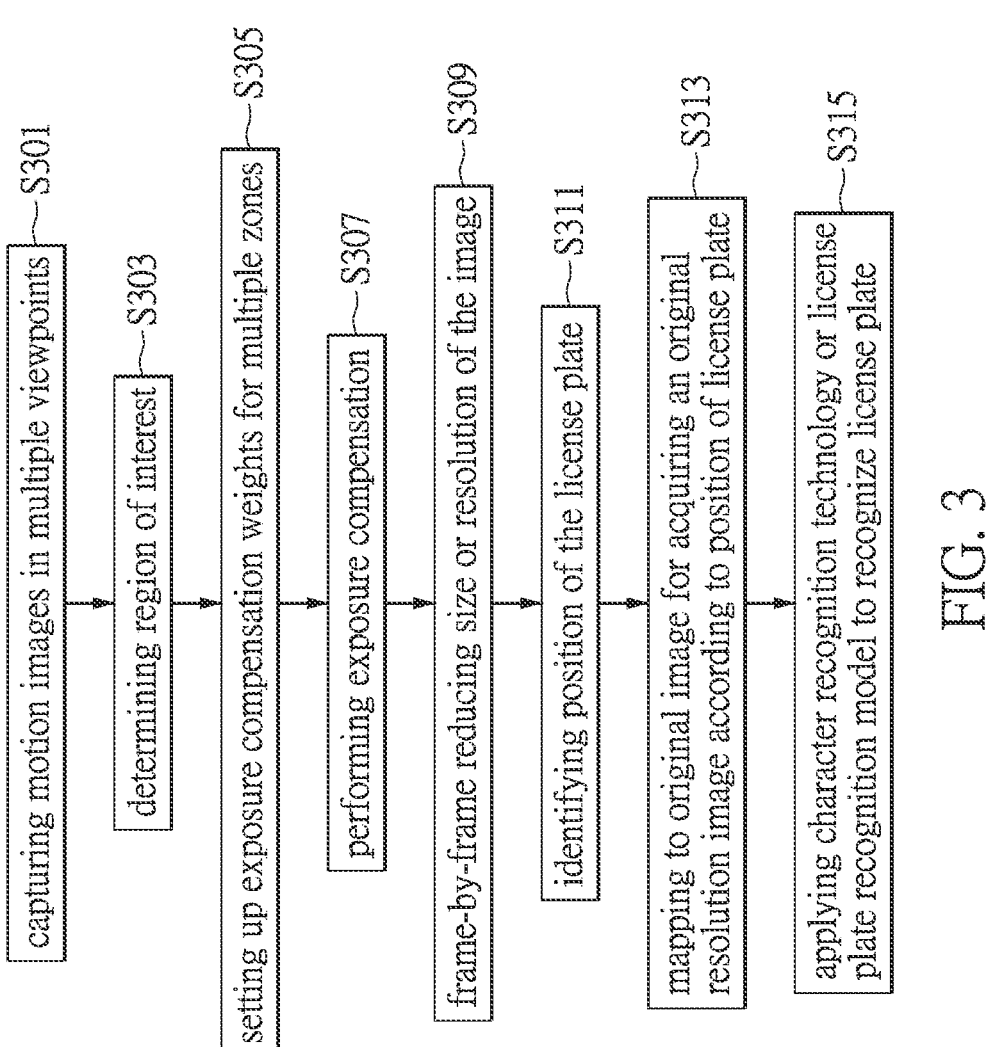

FIG. 3 capturing motion images in multiple viewpoints — S301 determining region of interest — S303 setting up exposure compensation weights for multiple zones — S305 performing exposure compensation — S307 frame-by-frame reducing size or resolution of the image — S309 identifying position of the license plate — S311 mapping to original image for acquiring an original resolution image according to position of license plate — S313 applying character recognition technology or license plate recognition model to recognize license plate — S315

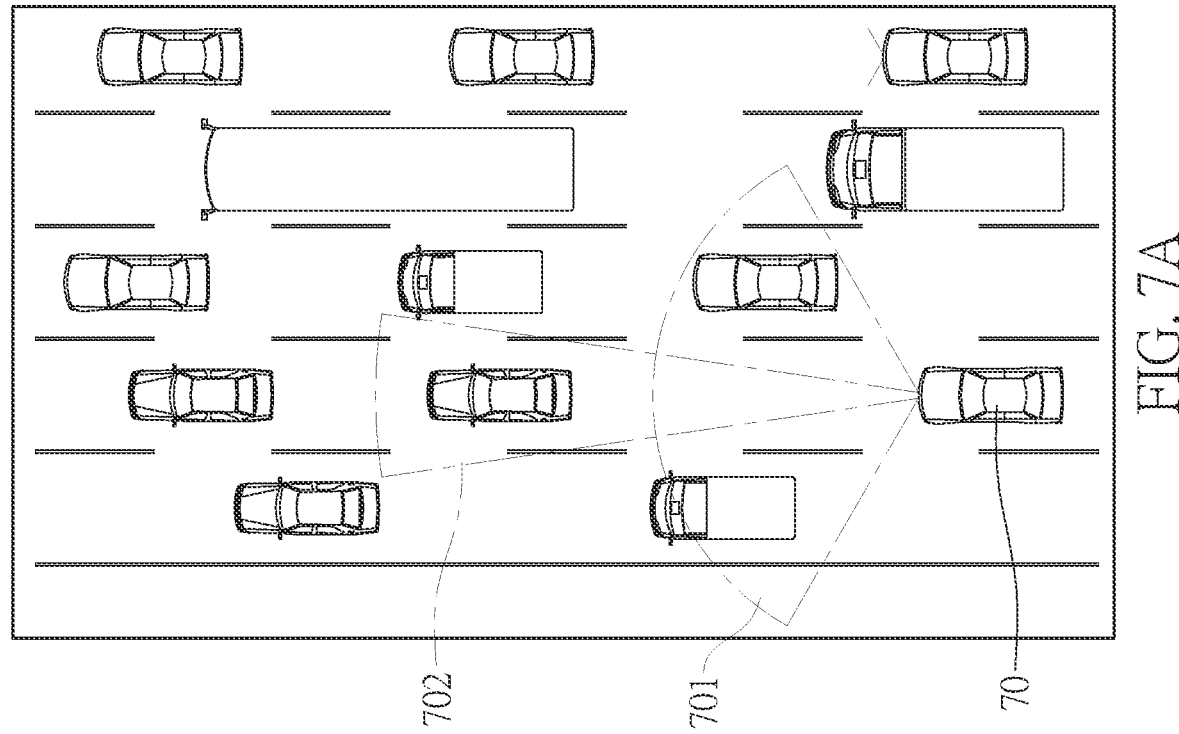
FIG. 7A
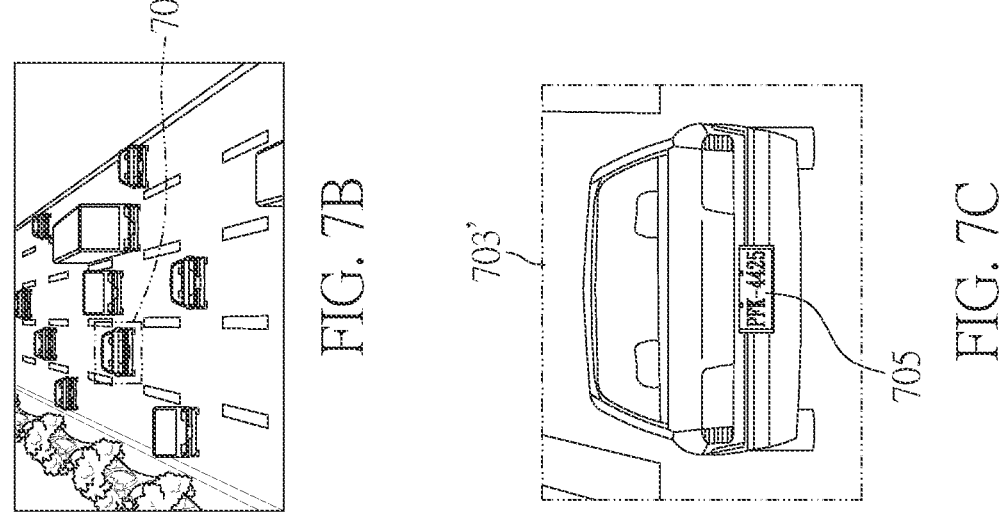
FIG. 7B
FIG. 7C

DRIVE RECORDER WITH LICENSE PLATE RECOGNITION FUNCTION AND METHOD FOR LICENSE PLATE RECOGNITION

CROSS-REFERENCE TO RELATED PATENT APPLICATION

This application claims the benefit of priorities to the U.S. Provisional Patent Application Ser. No. 63/523,864, filed on Jun. 28, 2023, and China Patent Application No. 202311264644.7, filed on Sep. 27, 2023. The entire content of U.S. Provisional Patent Application Ser. No. 63/523,864 and China Patent Application No. 202311264644.7 is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a drive recorder, and more particularly to a drive recorder that has a license plate recognition function and is capable of capturing multiple zones in one image and a method for performing license plate recognition.

BACKGROUND OF THE DISCLOSURE

A conventional drive recorder that applies automatic license plate recognition (ALPR) can integrate a plurality of technical elements, such as a camera module. In addition to recording videos while driving, the drive recorder needs to acquire a high-resolution image with sufficient details irrespective of ambient light, so as to perform license plate recognition. Further, the drive recorder is capable of optical character recognition (OCR) for recognizing a string of a license plate.

The conventional drive recorder usually uses a wide-viewing-angle lens to capture images. The drive recorder also needs to capture clear images in a low-light environment. However, it is difficult for the conventional drive recorder to acquire a high-resolution license plate image for successfully recognizing the content of the license plate from a wide-viewing-angle image or a low-light image. Moreover, even if the drive recorder adopts a high-resolution image sensor (e.g., a 4K image sensor), correctly recognizing the content of the license plate is still challenging since the license plate only occupies a small portion of a whole frame image.

Generally, the conventional drive recorder does not have a high-power image sensor, and it is difficult to achieve real-time license plate recognition due to insufficient computing power. In a conventional method for license plate recognition, the images are stored, and then a computer is additionally used to conduct license plate recognition.

Furthermore, the drive recorder is required to capture the images under various environments, and is also required to recognize the license plate that may change due to the influence of various ambient lights. Therefore, in the conventional license plate recognition, the license plate is likely to be unrecognizable from a blurred image due to under-exposure of the license plate, over-exposure of the license plate, or an insufficient shutter speed. The above-mentioned situations may cause the conventional drive recorder to have problems of low accuracy of license plate recognition or incapability to achieve real-time license plate recognition.

SUMMARY OF THE DISCLOSURE

In response to the above-referenced technical deficiencies (e.g., a conventional drive recorder cannot recognize a license plate due to under-exposure of the license plate caused by insufficient light, over-exposure of the license plate, or an insufficient shutter speed), the present disclosure provides a method for license plate recognition and a drive recorder with a license plate recognition function. Conventional deficiencies can be resolved by performing exposure compensation on multiple zones of an image. On the other hand, since it is difficult to perform license plate recognition due to insufficient resolution, the present disclosure further provides a solution by use of a multi-lens camera module.

In one aspect, main components of the drive recorder with the license plate recognition function include a processing circuit and a camera module. In the method for license plate recognition performed by the processing circuit, the camera module is configured to capture motion images having multiple zones, and the processing circuit determines one or more regions of interest in each of frames of the motion images according to features of a license plate, so as to designate exposure compensation weights respectively to the multiple zones. Next, according to the exposure compensation weights respectively designated to the multiple zones, the processing circuit performs different levels of exposure compensation on each of the frames of the motion images. Afterwards, exposure-compensated images of the license plate at an original resolution can be extracted for further license plate recognition.

Further, when the drive recorder acquires the motion images, each of the frames is converted to a reduced image, and a position of the license plate can be recognized from the reduced image. Since an appearance of the license plate in an image is larger than a content of the license plate, a small-sized embedded system can use less computing resources to recognize the position of the license plate in the reduced image when the original image is reduced.

Further, the features of the license plate are, for example, a size and the position of the license plate of a vehicle in a front-view image captured by the drive recorder. An object-recognition model trained by a machine-learning process is configured to recognize the position of the license plate in the reduced image.

After the position of the license plate is recognized from the reduced image, the position of the license plate is mapped to original frames, so as to extract the exposure-compensated images of the license plate at the original resolution for further license plate recognition.

In another aspect, a license-plate-recognition model trained by the machine-learning process or a character recognition technology can be configured to recognize the license plate.

Further, when capturing the motion images, the processing circuit sets up a maximum gain value, a minimum shutter speed, and an exposure value for one or more image sensors of the camera module, and performs image processing on each of the frames. The image processing includes at least one of processes of noise reduction, contrast adjustment, and grayscale. A local tone mapping technology can also be configured to enhance visibility of each of the frames.

In one further aspect, the camera module can be a multi-lens camera system that at least includes a first photographic lens configured to capture a wide-viewing-angle image and a second photographic lens configured to capture a narrow-viewing-angle image. The camera module can therefore capture the motion images having the multiple zones and covering wide viewpoints and narrow viewpoints.

In one more aspect, the camera module can be a multi-viewing-angle camera system that includes a viewpoint-changeable and rotatable photographic lens. When the camera module is in operation, the rotatable photographic lens is controlled to capture the motion images having the multiple zones and covering different viewpoints by a rotary shaft.

In one further aspect, the camera module is a multi-lens camera system that at least includes a first photographic lens for capturing images of a first viewpoint and a second photographic lens for capturing images of a second viewpoint. The multi-lens camera system is configured to capture the motion images having the multiple zones in different viewpoints.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which:

FIG. 3 is a flowchart describing a method for license plate recognition according to one embodiment of the present disclosure;

FIG. 7A to FIG. 7C are schematic diagrams illustrating images of viewpoint captured by a multi-lens drive recorder when the vehicle is in motion according to one embodiment of the present disclosure;

Figure 1:
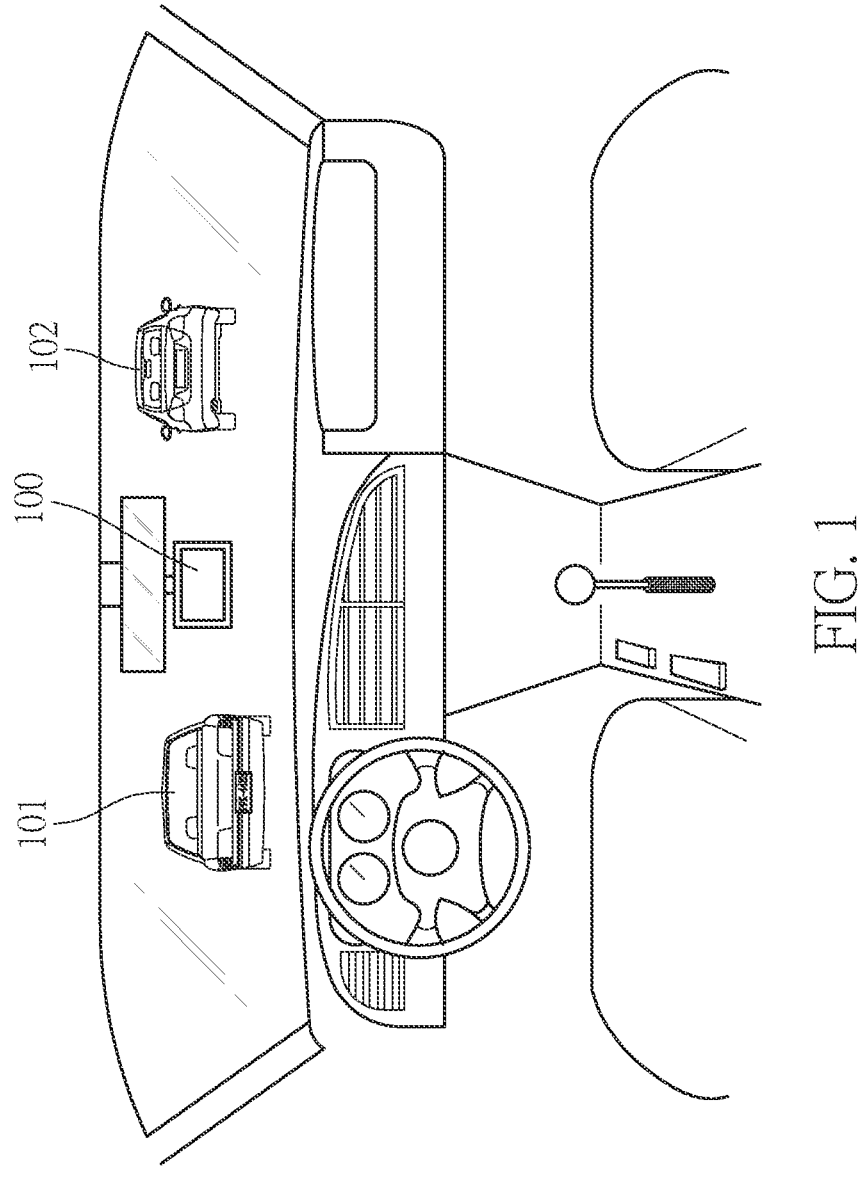
FIG. 1 is a schematic diagram illustrating a drive recorder with a license plate recognition function according to one embodiment of the present disclosure.

4 recorder when the vehicle is in motion according to yet another embodiment of the present disclosure.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

The present disclosure relates to a drive recorder with a license plate recognition function and a method for license plate recognition performed by the drive recorder. The present disclosure provides a solution for solving the problem that causes error in license-plate-recognition based on a blurred image (which can be caused by insufficient light or an insufficient shutter speed) or an overexposed image, or the problem of high reflection caused by a reflective license plate. In certain embodiments of the present disclosure, the drive recorder that includes a multi-lens camera module is provided for solving the problem of difficulty in license plate recognition due to insufficient resolution of the license plate in an image captured by the drive recorder.

For a related scenario, reference can be made to FIG. 1, which is a schematic diagram illustrating a drive recorder with a license plate recognition function according to one embodiment of the present disclosure. A drive recorder 100 is installed in a vehicle. The drive recorder 100 is configured to capture front-view images of the vehicle through a windshield. A first front vehicle 101 and a second front vehicle 102 are shown in the scenario of FIG. 1. It should be noted that the drive recorder 100 can be configured to capture images behind the vehicle or at other viewpoints.

Figure 2:
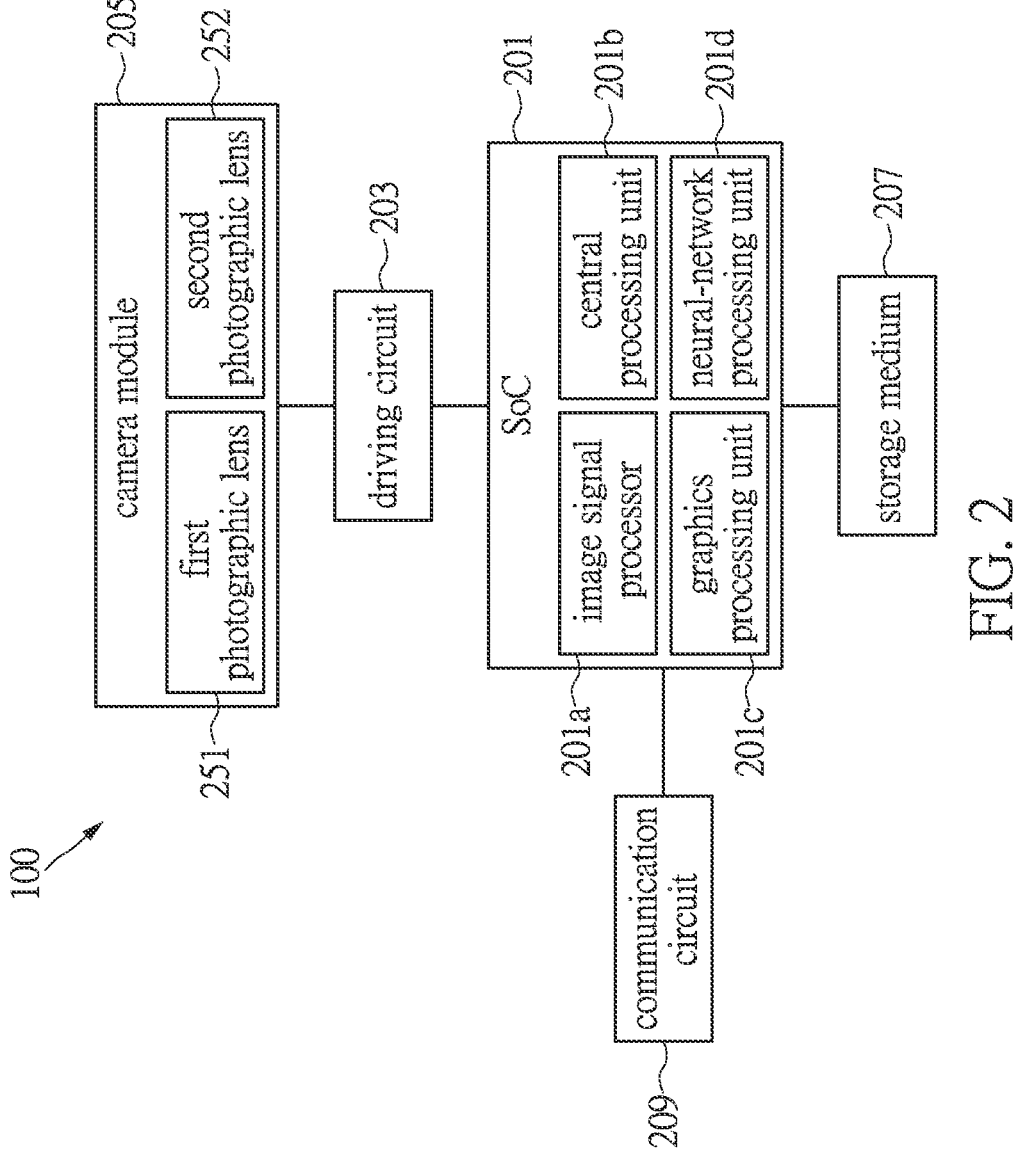
FIG. 2 is a schematic diagram illustrating main circuit components of the drive recorder with the license plate recognition function according to one embodiment of the present disclosure.

In particular, the license plate recognition function of the drive recorder 100 is configured to recognize the license plates of the first front vehicle 101 and the second front vehicle 102 from the motion images captured by the drive recorder 100. Reference is made to FIG. 2, which is a schematic diagram illustrating main circuit components of the drive recorder according to one embodiment of the present disclosure.

The main circuit components of the drive recorder 100 shown in FIG. 2 include a processing circuit that is configured to perform license plate recognition. The processing circuit can be a system-on-chip 201 that includes, but not limited to, multiple processing units, such as an image signal processor (ISP) 201$a$, a central processing unit (CPU) 201$b$, a graphics processing unit (GPU) 201$c$, and a neural-network processing unit (NPU) 201$d$. The system-on-chip 201 is electrically connected with other circuit components, such as a camera module 205 configured to capture images, a driving circuit 203 that operates the camera module 205, a storage medium 207, and a communication circuit 209. The camera module 205 can be a multi-lens camera system. The camera system includes a first photographic lens 251 and a second photographic lens 252. The camera module 205 also includes an image sensor that is configured to generate images captured by the first photographic lens 251 and the second photographic lens 252, and a processing circuit (not shown in the drawing).

The drive recorder 100 includes the storage medium 207 that is configured to store the motion images captured by the camera module 205 and a result generated by the license plate recognition procedure. The communication circuit 209 of the drive recorder 100 then transmits the images and data to an external system.

It should be noted that the drive recorder 100 is an edge device with low computing power. In the method for license plate recognition performed by the system-on-chip 201, what needs to be taken into consideration is that the computing performance may be affected when the resolution of the images becomes higher and the size of the images is getting larger. These changes will result in operational problems of the drive recorder 100. For example, the drive recorder 100 may be subject to overheating, crashing, insufficient computing power, and frame loss when processing higher resolution and larger images. Therefore, the drive recorder of the present disclosure will take its computing resources (such as capabilities of a processor and memory power) and the problems that may occur during image processing into consideration.

According to one of the embodiments of the method for license plate recognition, reference can be made to FIG. 2 and FIG. 3. FIG. 3 is a flowchart illustrating a method for license plate recognition according to certain embodiments of the present disclosure. Reference can also be made to the diagrams shown in FIG. 4A to FIG. 4C, which depict regions of interest acquired in the method for license plate recognition according to certain embodiments of the present disclosure.

Since the drive recorder 100 captures the images in various environments, the images may be unevenly exposed under various ambient light sources. For example, an image may be too bright in its near view and too dark in its far view; and a license plate of a vehicle in the image may be overexposed and/or underexposed. Further, the camera module 205 of the drive recorder 100 is required to capture a high-quality and wide-viewing-angle image, and is required to enhance the image quality in a low-light environment. In order to satisfy these requirements, in the method for license plate recognition, the image is divided into multiple zones that are separately processed with different levels of exposure compensation. Still further, since the vehicle usually occupies a small portion of the wide-viewing-angle image captured by the drive recorder, it is not easy to perform license plate recognition in the drive recorder. Accordingly, a multi-lens camera module is provided.

In the flowchart illustrating the method for license plate recognition (as shown in FIG. 3), the drive recorder 100 with the license plate recognition function captures motion images in multiple viewpoints by the camera module 205 (step S301). In the process of capturing the motion images, the images can be pre-processed by a processing circuit of the drive recorder. For example, the processing circuit sets up a gain value (e.g., a maximum gain value), a shutter speed (e.g., a minimum shutter speed), and an exposure value applied to one or more image sensors of the camera module. After the motion images having continuous frames are obtained, preliminary image-processing processes (such as noise reduction, contrast adjustment, and grayscale) can be performed on each of the frames. One or more of the preliminary image-processing processes can be selected according to practical requirements.

It should be noted that, in order to acquire a clear image, parameters for operating the camera module 205 of the drive recorder 100 can be mainly based on a shutter priority, and other parameters can be adjusted correspondingly. For example, when the drive recorder 100 is operated in the low-light environment, the camera module adjusts the gain value applied to the image sensor for increasing photosensitivity (e.g., an ISO value). When the photosensitivity is increased, the noise in the image may be increased. However, the image may be blurred if a de-noising process is performed at this time. Therefore, a local tone mapping process can be incorporated to the image-processing processes, so as to avoid blurring the image while enhancing the image.

Furthermore, since the image captured by the drive recorder is generally a wide-viewing-angle image, the position of the vehicle in the image and its surroundings can be recognized when performing license plate recognition. Therefore, the image can be divided into multiple zones based on recognition of the position of the vehicle and its surrounding. In this way, the motion images having the multiple zones can be obtained.

Figure 4A:
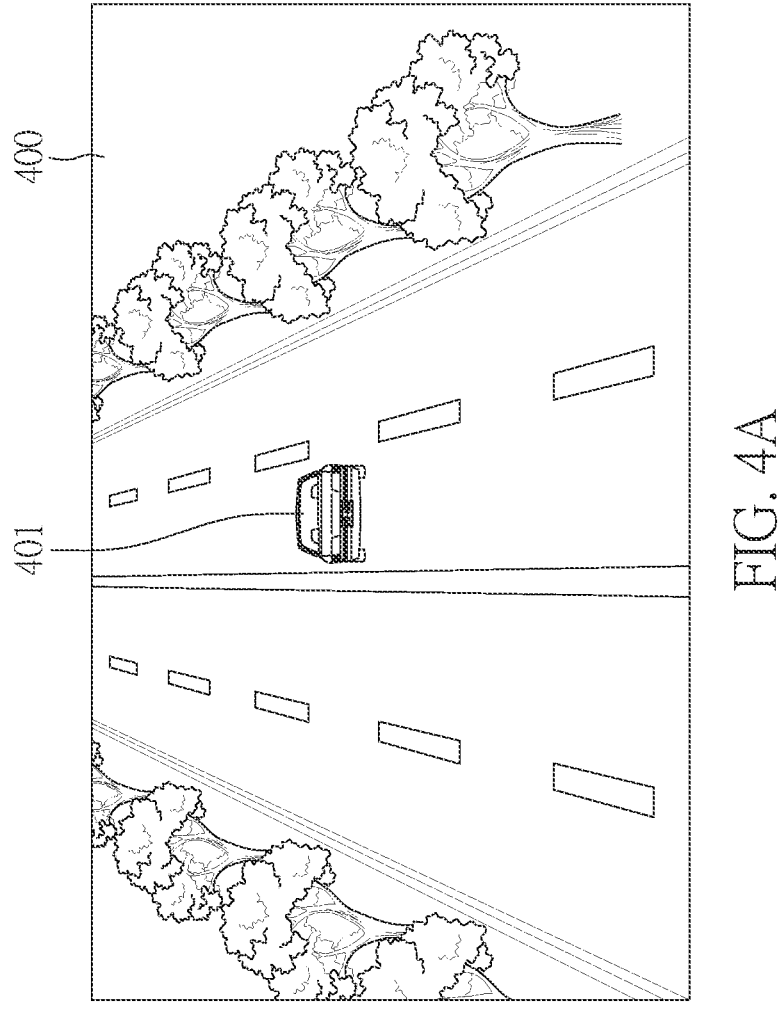
FIG. 4A to FIG. 4C are schematic diagrams illustrating a region of interest obtained in the method for license plate recognition according to one embodiment of the present disclosure.
Figure 5:
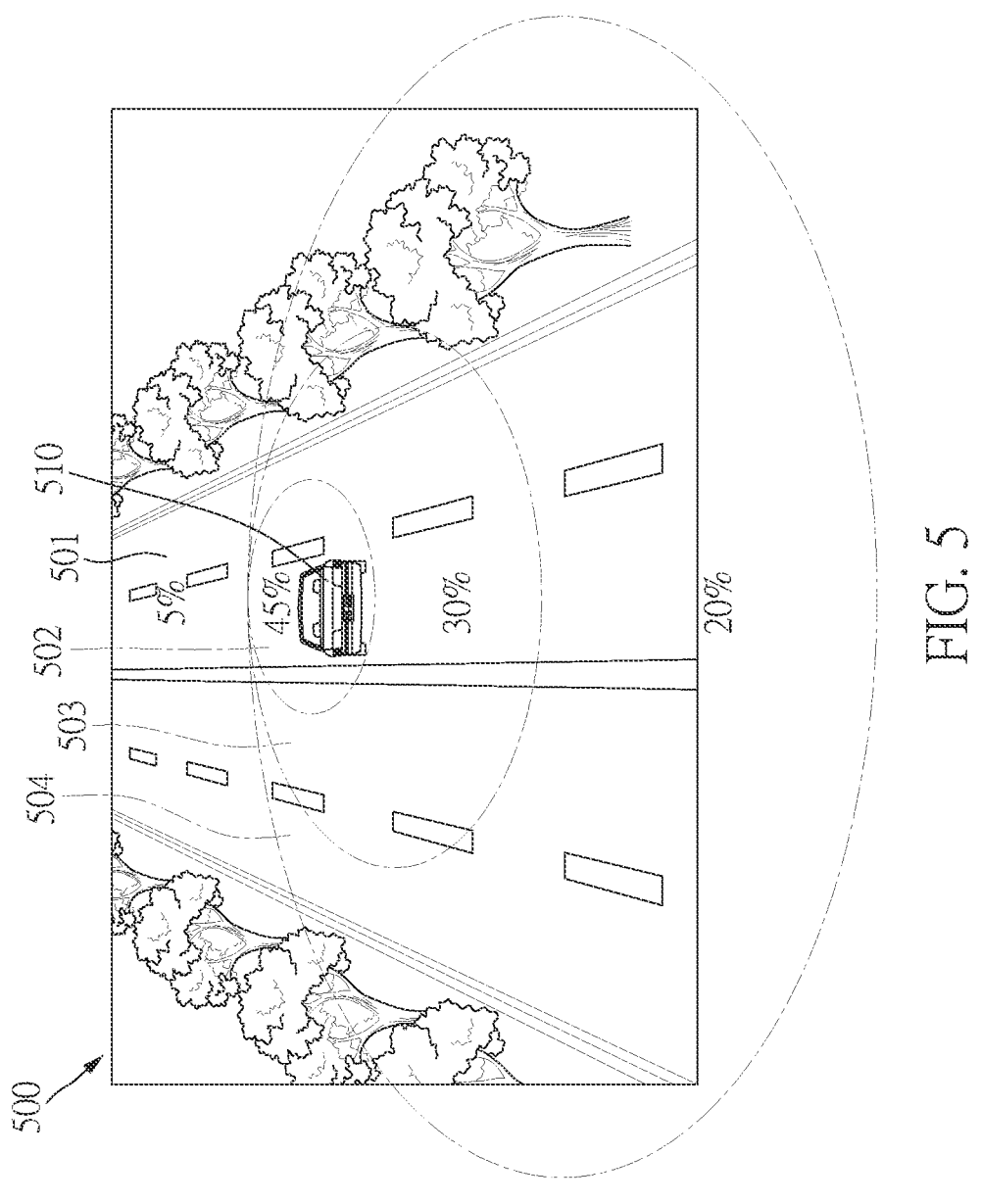
FIG. 5 is a schematic diagram illustrating designation of exposure compensation weights for multiple zones in the method for license plate recognition according to one embodiment of the present disclosure.

Reference is made to FIG. 4A, which is a frame 400 that is one of the frames of front-view images captured by the drive recorder. The frame 400 schematically shows that there is a vehicle 401 ahead. The drive recorder then performs license plate recognition on a license plate of the vehicle 401. One or more regions of interest (ROI) can be determined according to features (e.g., the size and the position) of the license plate (step S303). The system-on-chip (SoC) 201 of the drive recorder 100 can set up an exposure compensation weight for each of the multiple zones according to the region of interest (step S305), so as to perform exposure compensation on the multiple zones (step S307). In an automatic exposure procedure, the exposure compensation weights are respectively designated to the multiple zones. Reference is made to FIG. 5, which is a schematic diagram depicting exemplary exposure compensation weights of 5%, 45%, 30%, and 20% that are designated to different zones for performing different levels of exposure compensation on each of the frames of the motion images.

Figure 4B:
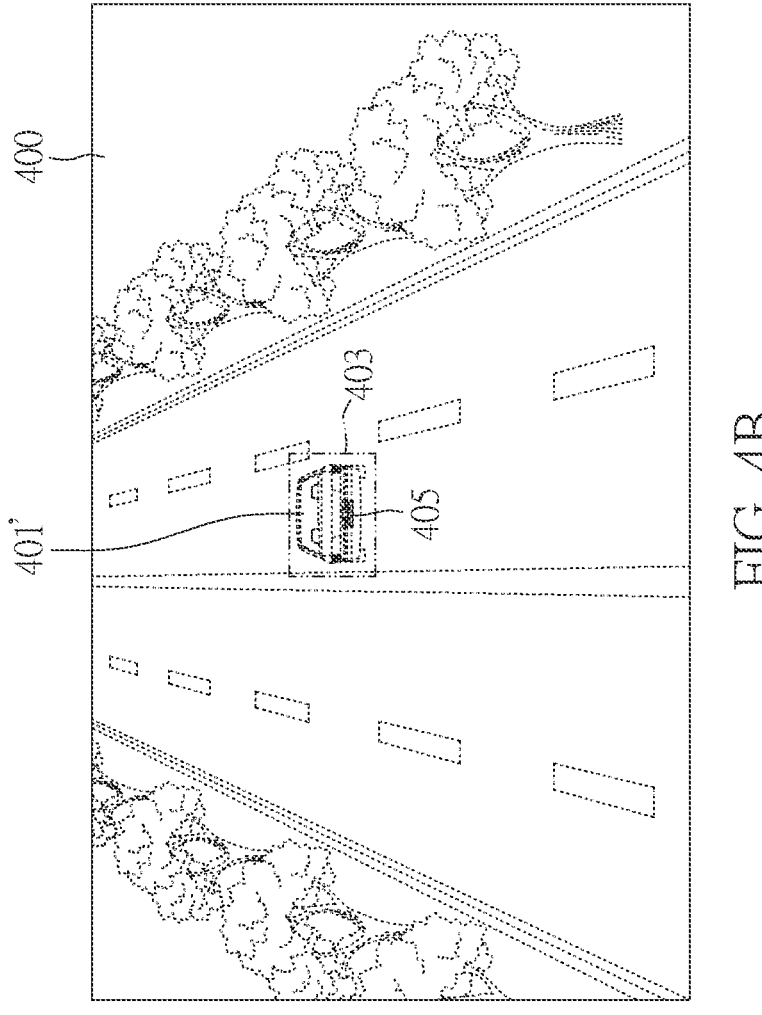
Figure 4C:
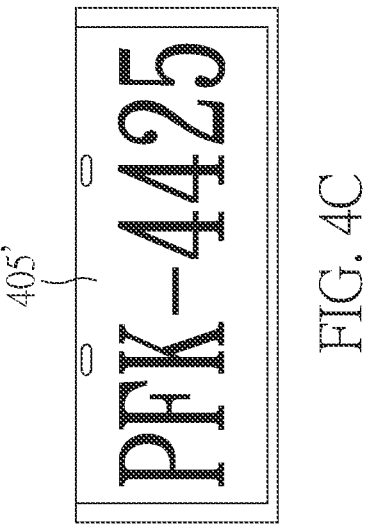

Further, considering that the computing resources required by the frame-by-frame image processing procedure are too large, in one embodiment of the present disclosure, the image size or the resolution of each of the frames can be reduced when the motion images are obtained (step S309). Referring to FIG. 4B (which exemplarily shows an image with a reduced resolution), in one of the embodiments of the present disclosure, the position of the license plate can be recognized from the reduced image or the image with reduced resolution according to features of the license plate by an image-processing procedure (step S311). FIG. 4B is a schematic diagram depicting an image that is reduced in size or resolution from an originally high-resolution image captured by the drive recorder. The image shown in FIG. 4B includes a vehicle 401' that is image-processed. The vehicle 401' is referred to for the system to determine a first region of interest 403, and the position of the license plate allows the system to render a second region of interest 405.

It should be noted that, in step S303 of the method for license plate recognition, multiple zones can be dynamically configured within the determined region of interest for each of the frames by taking different exposure amounts of objects in each frame into account. The size of each of the multiple zones can be different from one another. In step S305 and step S307, different levels of exposure compensation are respectively performed on different zones, so as to solve the problem of uneven brightness and darkness of the image captured by the drive recorder. The uneven brightness and darkness of the image may be caused by the changing ambient light or different distances of the objects in front of the vehicle when illuminated by a headlight of the vehicle. In one of the aspects, the objects at different locations in front of the vehicle reflect the headlight with different brightness, and this causes the problem of uneven exposure in different zones of the image. More particularly, the above-mentioned problem may cause the license plates in front of the vehicle to have different exposure amounts in the image. An exposure compensation mechanism can therefore be applied to correct the overexposed and underexposed zones of the image, so as to obtain a license plate image with even exposure.

For example, FIG. 5 shows a frame 500 of one of the frames captured by the drive recorder. Taking a vehicle in the middle of the frame 500 as an example, one or more regions of interest can be determined in each of the frames of the motion images based on the features of the license plate. Afterwards, multiple zones in the frame 500 can be determined according to distances, exposures, and positions of the regions of interest. Next, different exposure compensation weights are respectively designated to the multiple zones. In practice, the quantity of the zones and the exposure compensation weights should not be taken as limiting the scope of the present disclosure.

In the schematic diagram of FIG. 5, the frame 500 is divided into multiple zones, which include: a first zone 501 that is designated with an exposure compensation weight of "5%", a second zone 502 that is designated with a higher (in this example, the highest) exposure compensation weight of "45%" for covering a vehicle 510, a third zone 503 that is designated with an exposure compensation weight of "30%" for being within a determined region of interest, and a fourth zone 504 that is designated with an exposure compensation weight of "20%" for covering a larger range and being closer to the drive recorder.

After different levels of exposure compensation are completely applied to the frames according to the above-mentioned process, the entire frame can be evenly exposed. Therefore, the images of the license plate that are exposure-compensated in each frame and are in an original resolution can be obtained. The license plate extracted from the image is, for example, a license plate 405' shown in FIG. 4C, and can be used for license plate recognition.

According to one embodiment of the method for license plate recognition, an object-recognition model trained by a machine-learning process can be used to recognize the license plate in each of the frames. When the object-recognition model is in a training process, a large amount of images of the object (e.g., the vehicle) in various lights and angles are generated and inputted to a machine-learning algorithm, and image features of the object can be learned and classified by an image-processing technology. In this way, the object-recognition model that is able to recognize the object in images is trained. Taking a license plate as an example, the features of the license plate include a square appearance, a uniform white or different colored background, and a dark license plate string consisting of English letters and numbers. These features of the license plate are referred to for training a license plate recognition model that can be used to recognize the position of the license plate in the image that is reduced in size or resolution.

After the position of the license plate is recognized in step S311 of FIG. 3, the position of the license plate can be mapped to an original frame image, so as to acquire the license plate in an original resolution. The image of the license plate that is exposure-compensated and in the original resolution is obtained (step S313). License plate recognition with a character-recognition technology is then performed on the license plate for recognizing the string of the license plate. For example, a character recognition technology (e.g., optical character recognition) is used to recognize the license plate, or a license-plate-recognition model trained by the machine-learning process is configured to recognize the license plate (step S315).

In the method for license plate recognition of the present disclosure, reference can first be made to the above embodiments in which different exposure compensation weights are designated to different zones within the region of interest of the image, different levels of exposure compensation are applied to the multiple zones of the image, and then the license plate recognition is performed on the multiple zones with exposure compensation. Before performing license plate recognition, the drive recorder can further use a multi-lens camera system to capture a wide-viewing-angle image for license plate recognition.

Figure 6:
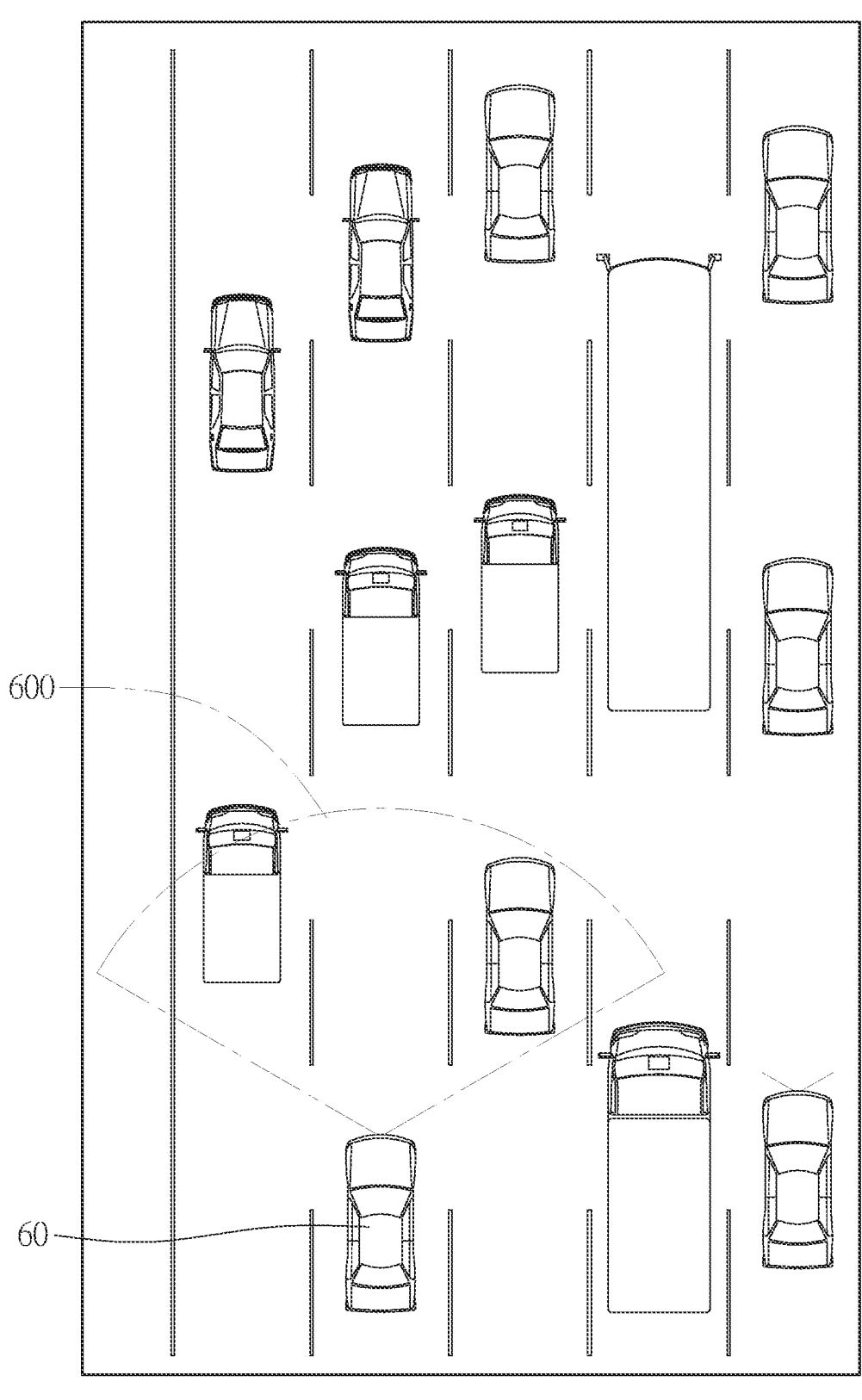
FIG. 6 is a schematic diagram depicting a viewpoint captured by the drive recorder when a vehicle is in motion according to one embodiment of the present disclosure.

Reference is made to FIG. 6, which is a schematic diagram depicting a viewpoint captured by the drive recorder when a vehicle is in motion. In FIG. 6, there are multiple vehicles driving on a driveway at the same time. A main vehicle 60 utilizes a single-lens camera module to capture an image in a viewpoint 600. The viewpoint 600 indicates a range in front of the main vehicle 60 or in a specific direction where the light can be sensed by the image sensor of the camera module of the drive recorder.

FIG. 7A to FIG. 7C are schematic diagrams illustrating different viewpoints captured by a multi-lens drive recorder when the vehicle is in motion according to one embodiment of the present disclosure. The camera module can be a multi-lens camera system that at least includes a first photographic lens configured to capture wide-viewpoint images and a second photographic lens configured to capture narrow-viewpoint images with details. Therefore, the camera module is able to capture the motion images having the multiple zones and simultaneously covering wide viewpoints and narrow viewpoints.

FIG. 7A shows that a drive recorder of a main vehicle 70 includes a camera system including at least two lens that are able to capture two types of images covering a first viewpoint 701 and a second viewpoint 702. In the present example, the first viewpoint 701 indicates a wide-viewing-angle image in front of the main vehicle 70, and the second viewpoint 702 indicates the image captured by the camera module via a long focal length lens (which is able to capture a clearer image of the vehicle in front of the main vehicle 70).

Next, when the license plate recognition is performed, the images in different viewpoints can be referred to for determining a region of interest 703 that is formed by the vehicle and the license plate that are recognized from the image (as shown in FIG. 7B). Further, FIG. 7C shows that the content of a license plate 705 within a region of interest 703' in a narrower viewpoint is recognized.

Figure 8A:
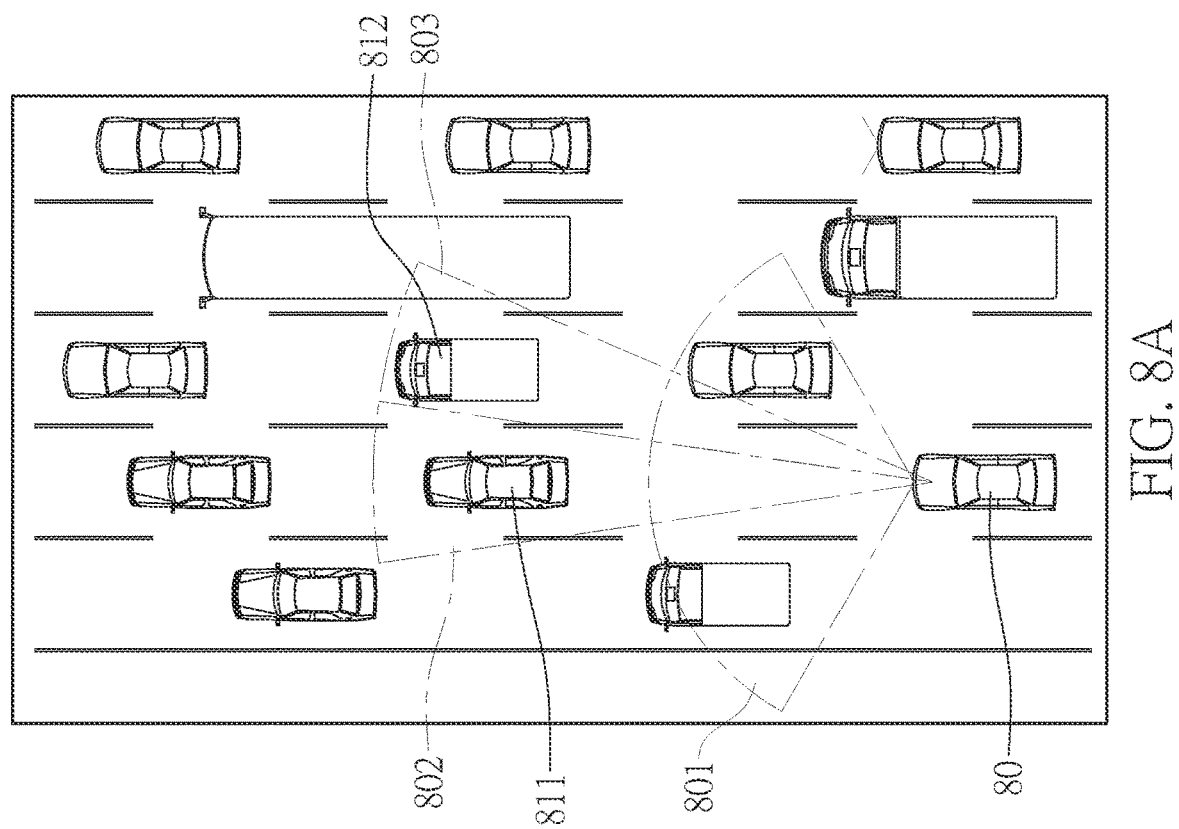
FIG. 8A and FIG. 8B are schematic diagrams illustrating images of viewpoint captured by the multi-lens drive recorder when the vehicle is in motion according to another embodiment of the present disclosure.
Figure 8B:
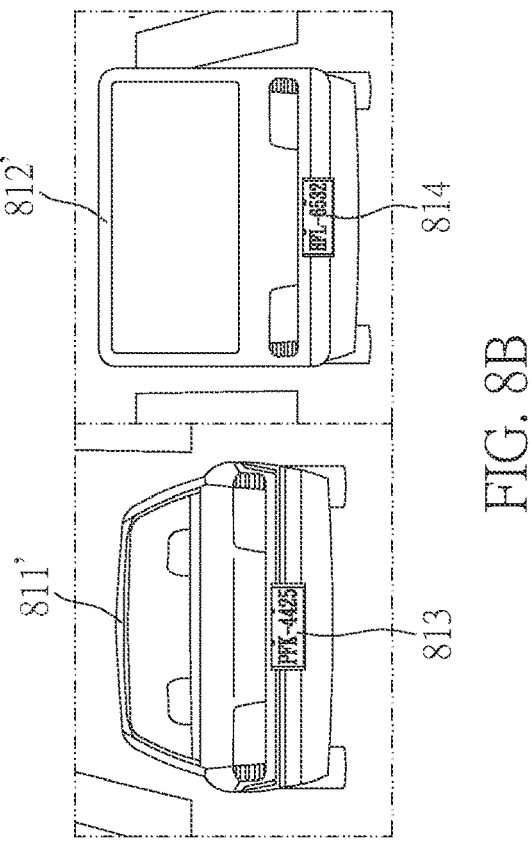

FIG. 8A and FIG. 8B are schematic diagrams illustrating different viewpoints that are captured by the multi-lens drive recorder when the vehicle is in motion according to another embodiment of the present disclosure. The camera module of the drive recorder is a multi-viewing-angle camera system that includes a viewpoint-changeable and rotatable photographic lens. The rotatable photographic lens is controlled by a rotary shaft to capture the motion images having the multiple zones and covering different viewpoints.

FIG. 8A schematically shows several vehicles on a driveway. The drive recorder of a main vehicle 80 includes a multi-lens camera system that includes a viewpoint-changeable and rotatable photographic lens. The multi-lens camera system captures a wide-viewing-angle image of a first viewpoint 801. Through a driving circuit (e.g., the driving circuit 203 of FIG. 2), a processing circuit controls the rotatable photographic lens by a rotary shaft, so as to separately capture the images with narrower viewpoints in a second viewpoint 802 and in a third viewpoint 803. The multi-lens camera system can clearly capture the images of a first vehicle 811 and a second vehicle 812 in front of the main vehicle 80. In practice, the rotatable photographic lens is able to capture more images in other viewpoints.

In addition to capturing images of the first viewpoint 801 (which cover the surroundings), the drive recorder also captures the image of the first vehicle 811 in the second viewpoint 802 by the rotatable photographic lens, and captures the image of the second vehicle 812 in the third viewpoint 803. The drive recorder then proceeds with the license plate recognition procedure. FIG. 8B shows an image that covers both a first vehicle 811' and a second vehicle 812' in different viewpoints, and a first license plate 813 of the first vehicle 811' and a second license plate 814 of the second vehicle 812' can be accurately recognized therefrom.

Figure 9A:
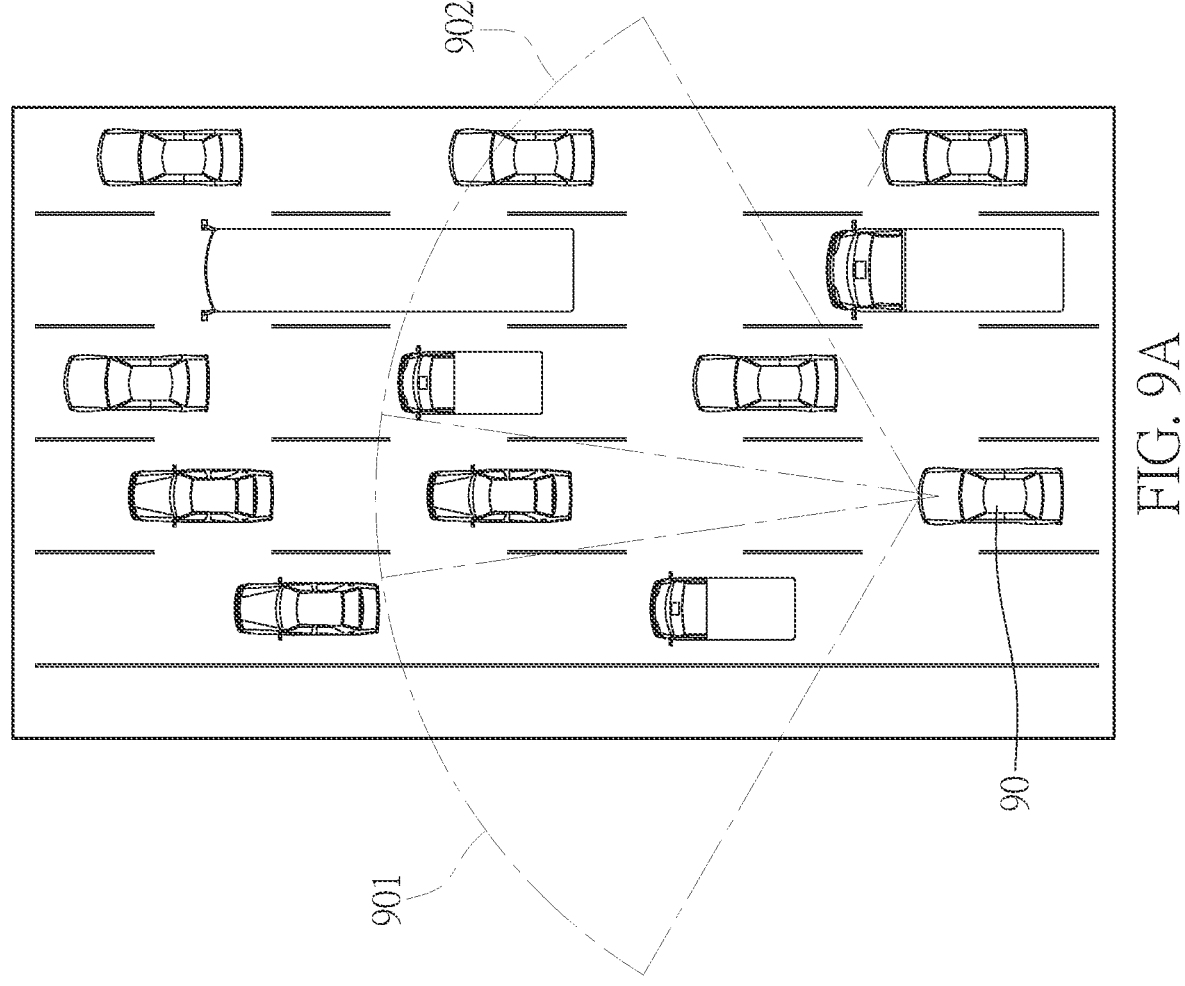
FIG. 9A and FIG. 9B are schematic diagrams illustrating images of viewpoint captured by the multi-lens drive
Figure 9B:
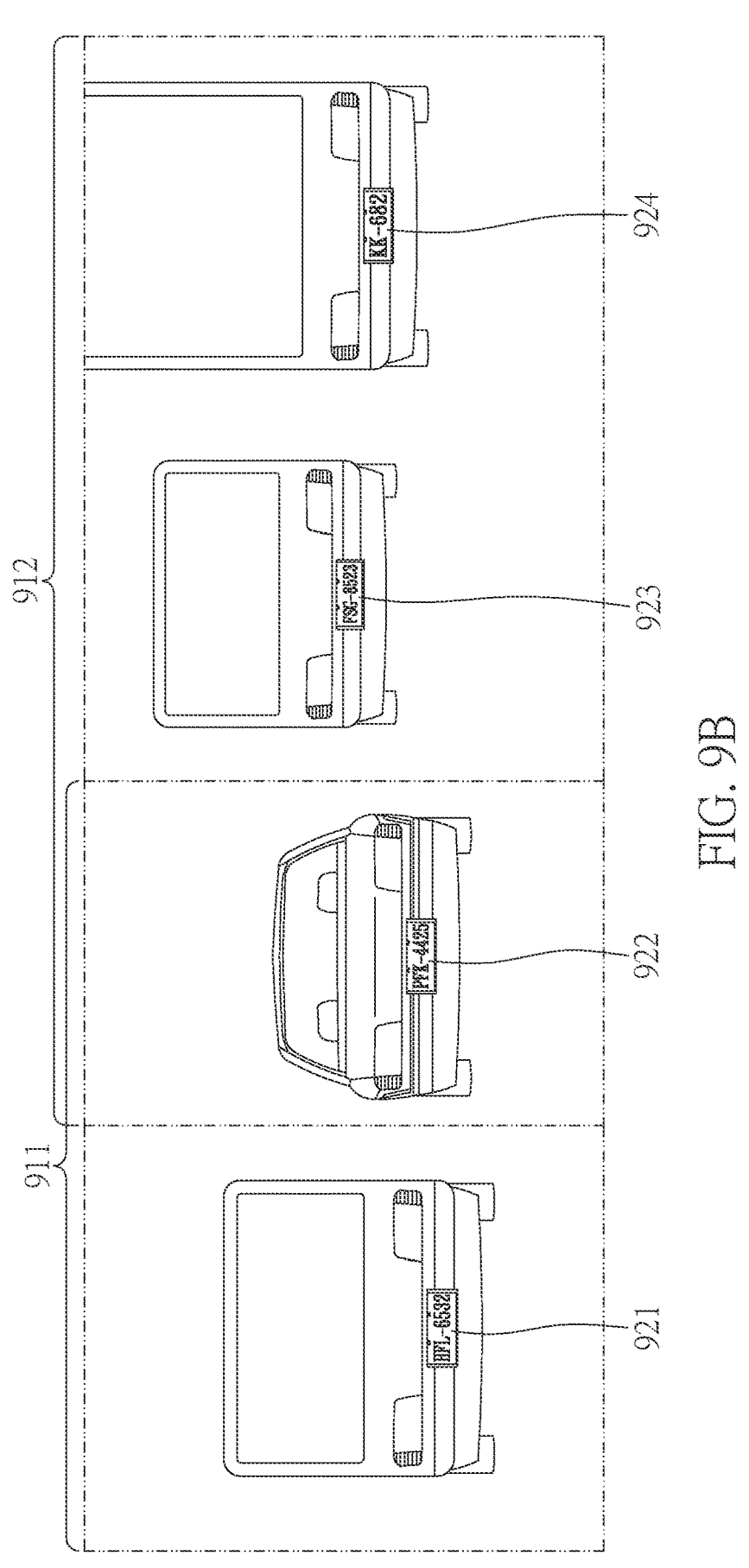

FIG. 9A and FIG. 9B are schematic diagrams showing an image having different viewpoints captured by the multilens drive recorder when the vehicle is in motion according to yet another embodiment of the present disclosure. The camera module of the drive recorder is a multi-lens camera system that at least includes a first photographic lens configured to capture a first viewpoint image and a second photographic lens configured to capture a second viewpoint image. It should be noted that the first viewpoint and the second viewpoint can have the same viewing angle but different directions, or can have different viewing angles and different directions, so as to separately capture the motion images having the multiple zones from different viewpoints.

In FIG. 9A, the drive recorder of a main vehicle 90 driving on a driveway can capture the images in a first viewpoint 901 and in a second viewpoint 902 at the same time. The present example shows that the first viewpoint 901 partially overlaps with the second viewpoint 902. FIG. 9B shows an image that includes a first viewpoint image 911 covering the first viewpoint 901 and a second viewpoint image 912 covering the second viewpoint 902.

In the image captured by the multi-lens camera module of the present example, the first viewpoint image 911 includes vehicles 921 and 922 in front of the main vehicle 90, and the second viewpoint image 912 includes vehicles 922, 923, and 924. The vehicle 922 appears in both viewpoint images 911 and 912. In this way, the drive recorder can acquire a clearer image of the license plate ahead of the main vehicle 90, which is beneficial for license plate recognition.

In summation, according to certain embodiments of the drive recorder with the license plate recognition function and the method for license plate recognition operated in the drive recorder, the drive recorder incorporates a dynamic exposure compensation mechanism to acquire an evenly-exposed image for license plate recognition, so as to satisfy the requirement that the drive recorder needs to perform license plate recognition under various light sources or solve the problem of high reflection caused by the design of the license plate. On the other hand, a multi-lens camera module is used in the drive recorder, so as to provide images in various viewpoints and solve the problem of difficulty in license plate recognition due to insufficient resolution of the image.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A drive recorder with a license plate recognition function, comprising:
   a processing circuit; and
   a camera module configured to capture motion images covering multiple viewpoints;
   wherein the processing circuit performs a method for license plate recognition, and the method comprises:
   capturing, by the camera module, the motion images having multiple zones;
   determining one or more regions of interest in each of frames of the motion images according to features of a license plate, and designating exposure compensation weights respectively to the multiple zones, wherein a first zone corresponding to a first portion of an environment at least partially surrounding a first region of interest of the one or more regions of interest is designated with a first exposure compensation weight and a second zone corresponding to a second portion of the environment at least partially surrounding the first region of interest is designated with a second exposure compensation weight different than the first exposure compensation weight;
   performing different levels of exposure compensation on each of the frames of the motion images according to the exposure compensation weights respectively designated to the multiple zones; and
   extracting an image of the license plate from each of the frames after performing the exposure compensation, and performing the license plate recognition.

2. The drive recorder according to claim 1, wherein, after the exposure compensation is completed, each of the frames is converted to a reduced image, and a position of the license plate is recognized from the reduced image.

3. The drive recorder according to claim 2, wherein the features of the license plate are a size and the position of the license plate of a vehicle in a front-view image captured by the drive recorder.

4. The drive recorder according to claim 3, wherein an object-recognition model trained by a machine-learning process is configured to recognize the position of the license plate from the reduced image.

5. The drive recorder according to claim 2, wherein, after the position of the license plate is recognized from the reduced image, the position of the license plate is mapped to original frames, so as to extract exposure-compensated images of the license plate at an original resolution for further license plate recognition.

6. The drive recorder according to claim 5, wherein a character recognition technology is configured to recognize the license plate, or a license-plate-recognition model trained by a machine-learning process is configured to recognize the license plate.

7. The drive recorder according to claim 1, wherein the multiple zones are dynamically set with different sizes, so that the different levels of the exposure compensation are respectively performed on different zones according to the one or more regions of interest and exposure amounts of different objects in each of the frames.

8. The drive recorder according to claim 1, wherein, when capturing the motion images, the processing circuit sets up a maximum gain value, a minimum shutter speed, and an exposure value for one or more image sensors of the camera module, and performs image processing on each of the frames; wherein the image processing comprises at least one of processes of noise reduction, contrast adjustment, or grayscale.

9. The drive recorder according to claim 8, wherein a local tone mapping technology is configured to enhance visibility of each of the frames.

10. The drive recorder according to claim 1, wherein the camera module is a multi-lens camera system that at least comprises a first photographic lens configured to capture wide-viewing-angle images and a second photographic lens configured to capture narrow-viewing-angle images, so that the camera module is able to capture the motion images covering wide viewpoints and narrow viewpoints.

11. The drive recorder according to claim 1, wherein the camera module is a multi-viewing-angle camera system that comprises a viewpoint-changeable and rotatable photographic lens, and the viewpoint-changeable and rotatable photographic lens is controlled to capture the motion images covering different viewpoints by a rotary shaft when the camera module is in operation.

12. The drive recorder according to claim 1, wherein the camera module is a multi-lens camera system that at least comprises a first photographic lens for capturing images of a first viewpoint and a second photographic lens for capturing images of a second viewpoint, so as to separately capture the motion images of different viewpoints.

13. A method for license plate recognition, which is performed on a drive recorder, the method comprising:

capturing, by a camera module, motion images covering
        multiple viewpoints;

determining one or more regions of interest in each of
        frames of the motion images according to features of a
        license plate, and designating exposure compensation
        weights respectively to multiple zones, wherein a first
        zone corresponding to a first portion of an environment
        at least partially surrounding a first region of interest of
        the one or more regions of interest is designated with a
        first exposure compensation weight and a second zone
        corresponding to a second portion of the environment
        at least partially surrounding the first region of interest
        is designated with a second exposure compensation
        weight different than the first exposure compensation
        weight;

performing different levels of exposure compensation on
        each of the frames of the motion images according to
        the exposure compensation weights respectively des-
        ignated to the multiple zones; and extracting an image of the license plate from each of the
        frames after performing the exposure compensation,
        and performing the license plate recognition.

14. The method according to claim 13, wherein, after the exposure compensation is completed, each of the frames is converted to a reduced image, and a position of the license plate is recognized from the reduced image.

15. The method according to claim 14, wherein an object-recognition model trained by a machine-learning process is configured to recognize the position of the license plate from the reduced image.

16. The method according to claim 15, wherein, after the position of the license plate is recognized from the reduced image, the position of the license plate is mapped to original frames, so as to extract exposure-compensated images of the license plate at an original resolution for further license plate recognition.

17. The method according to claim 16, wherein a character recognition technology is configured to recognize the license plate, or a license-plate-recognition model trained by a second machine-learning process is configured to recognize the license plate.

18. The method according to claim 13, wherein, when capturing the motion images, a processing circuit of the drive recorder sets up a maximum gain value, a minimum shutter speed, and an exposure value for one or more image sensors of the camera module, and performs image process-ing on each of the frames; wherein the image processing comprises at least one of processes of noise reduction, contrast adjustment, or grayscale.

19. The method according to claim 13, wherein the multiple zones are dynamically set with different sizes, so that the different levels of the exposure compensation are respectively performed on different zones according to the one or more regions of interest and exposure amounts of different objects in each of the frames.

20. The drive recorder according to claim 1, wherein the second zone is between the camera module and the first zone, the second exposure compensation weight is less than the first exposure compensation weight, a third zone corre-sponding to a third portion of the environment at least partially surrounding the first region of interest is designated with a third exposure compensation weight, the first zone is between the camera module and the third zone, and the third exposure compensation weight is less than the first exposure compensation weight and less than the second exposure compensation weight.

* * * * *